United States Patent [19]
Chan

[11] 4,032,940
[45] June 28, 1977

[54] RETRACTABLE CAMERA

[75] Inventor: Kwok Yan Chan, Hong Kong

[73] Assignee: W. Haking Industries, Ltd., North Point, Hong Kong

[22] Filed: July 2, 1975

[21] Appl. No.: 592,402

Related U.S. Application Data

[63] Continuation-in-part of Ser. No. 539,986, Jan. 10, 1975, abandoned.

[52] U.S. Cl. .................. 354/219; 354/187; 354/204; 354/213; 354/288; 354/354
[51] Int. Cl.² ........................................ G03B 13/02
[58] Field of Search .......... 354/187, 189, 202, 204, 354/205, 206, 212, 219, 223, 288, 354, 213, 217, 218

[56] References Cited

UNITED STATES PATENTS

| | | | |
|---|---|---|---|
| 2,367,195 | 1/1945 | Bolsey | 354/205 |
| 3,153,995 | 10/1964 | Bretthauer et al. | 354/219 |
| 3,680,455 | 8/1972 | Meinunger | 354/187 |
| 3,864,705 | 2/1975 | Winkler | 354/212 |
| 3,893,139 | 7/1975 | Winkler et al. | 354/204 |

FOREIGN PATENTS OR APPLICATIONS 2,028,431  12/1971  Germany .......................... 354/288

Primary Examiner—Russell E. Adams, Jr.
Attorney, Agent, or Firm—Wallenstein, Spangenberg, Hattis & Strampel

[57] ABSTRACT

A preferably pocket-sized camera having an overall shape which is thin in its vertical dimension has its horizontal longitudinal dimension shortened by constructing the camera in two relatively horizontally telescoping sections. One of the camera sections is a main camera section including substantially all of the components of a still camera except for the viewfinder portion thereof. The other section of the camera has a housing which interfits with the housing of the main camera sections so in its retracted position the front and rear viewfinding lens elements thereof interleave with elements of the main camera housing. When the viewfinder section is in its extended position, the front and rear viewfinder lens elements are unobstructed. In the retracted position of the viewfinder section, a part thereof covers the objective lens and shutter release member in the main section of the camera, and wall elements of the main camera section cover over the viewfinder lens elements. The movable viewfinder carrying section is provided with means for cocking the shutter operating mechanism of the camera and removing a film perforation sensing finger as it is moved to its retracted position and means for effecting a film advancing operation when the viewfinder section is moved to its extended position.

22 Claims, 14 Drawing Figures

RETRACTABLE CAMERA

RELATED APPLICATION

This application is a continuation-in-part of application Ser. No. 539,986, filed Jan. 10, 1975, now abandoned.

BACKGROUND OF THE INVENTION

Retractable cameras have been developed of the type comprising a camera housing having two sections, one of which carries the viewfinder lenses and is movable with relation to the other to an extended picture taking position and where the various lenses thereof are positioned to receive the external light rays, and to a retracted, non-picture taking position where the lenses are only in part shielded from dust and are in inoperative conditions. Exemplary of such a camera is the one disclosed in U.S. Pat. No. 3,864,705. U.S. Pat. No. 3,153,995 to Bretthauser et al. and is another example of such a retractable camera. These, exemplary retractable cameras were so designed that in the retracted conditions thereof at least some of the lens or other light passing surfaces thereof were exposed to dust. While some camera constructions incorporated a cover which enclosed all light passing portions thereof, these camera constructions were not of the type having retractable and extendable viewfinder carrying housing sections. Thus, in U.S. Pat. No. 3,495,223 to Bodlander, a cover is provided for the light passing surfaces, but the cover has to be removed from one end of the camera and inserted upon another portion thereof, which makes the cover inconvenient to use. Also, U.S. Pat. No. 3,153,375 discloses a non-retractable camera which uilizes a reciprocating film winding member which also acts as a cover on only one side of the camera housing for lens elements exposed only on that side.

Retractable cameras generally are kept in their retracted, compact condition when not in use and the act of moving the camera sections together into this condition is generally accomplished with much greater force and speed than the act of setting up the camera for use when the camera sections are separated. The act of moving the camera sections together effects a one frame length film advancement so the camera is automatically in condition for operation when the camera sections are subsequently separated. The type of camera disclosed in said U.S. Pat. No. 3,864,705 is one which utilizes a film cartridge where film metering to assure one frame advancement during each retraction of the movable section of the housing is achieved by a film metering pawl which is urged toward the film and adapted successively to enter one frame spaced film frame perforations in the film, where it operates means for disabling the film moving mechanism. The film moving mechanism generally includes a drive gear on the camera body which meshes with a gear on the film cartridge. The film metering pawl is subsequently withdrawn from a film perforation associated with the exposed frame of the film and moved in a direction opposite to that in which the film is being advanced, to permit another film metering operation to occur. The retraction of the movable camera section effects removal of the pawl from the film perforation so the pawl can engage an unapertured portion of the film and effect the termination of a film winding operation when the pawl enters a new perforation. Under normal conditions of operation, the film is advanced at a speed where the pawl can respond quickly enough to enter the next film perforation moved opposite the same. However, in those instances where the user, for some reason, exerts unusual force in pushing the movable section of the camera body to its retracted position, the film metering pawl may not move fast enough to enter the perforation moved opposite the same, with the result that the film overshoots its position where a film wind locking operation should take place. Depending upon the force exerted by the user, the extent of the overshoot can be as much as a frame and a half and causes overlapping of adjacent frames which spoils the pictures involved and wastes appreciable film. Apart from this shortcoming, retractable cameras of the type shown in U.S. Pat. No. 3,864,704 utilize complex gear train and clutch mechanisms to control film advancement which materially increase manufacturing costs.

SUMMARY OF THE INVENTION

While some of the various features of the present invention have a broader application, they have their most important use in a class of still cameras referred to as pocket cameras, which have a horizontally elongated vertically thin profile which enable them readily to be placed in a shirt pocket or the like. These cameras generally have a rear cover-forming wall which pivots down into a position which exposes an opening into the rear of the camera housing into which a film cartridge is insertable into the camera. The front wall of the housing has an opening or window in alignment with the objective lens of the camera. Generally, a viewfinder is provided at one end margin of the camera, the viewfinder including front and rear lens elements. The rear viewfinder lens element is generally visible through an opening in the pivotally mounted rear wall of the housing. A front lens element is generally mounted contiguous to the front wall of the camera housing.

In accordance with one of the features of the invention, the camera is made in two sections, one being a main camera section including all of the operating elements of the camera except for the viewfinder portion thereof. The viewfinder portion forms a separate section mounted on the end of the main camera section for horizontal sliding movement between a retracted inoperable position, where the end magin thereof is adjacent the corresponding end margin of the pivotally mounted rear wall of the camera, and an extended operative position. The viewfinder sections includes a housing which appears as a general extension of the corresponding portions of the housing of the main camera section. In this retracted position of the viewfinder section, the front and rear viewfinder lens elements are behind or within portions of the main section of the camera which act as dust covers therefor. The viewfinder section of the camera has a front wall which acts as a dust cover for the objective lens in the main section of the camera housing when the viewfinder section is in its retracted position, so all light transparent surfaces on both section of the camera are protected from dust. Also, the viewfinder section then covers over the shutter release member generally exposed on the top wall of the housing of the main section of the camera.

In accordance with another feature of the present invention, the viewfinder carrying section of the camera is coupled to a unique mechanism which enables film advance to take place only when the viewfinder carrying section is moved to its extended, operative position and shutter cocking occurs during the retraction of the viewfinder carrying section. This is in sharp contrast to the operation of the retractable cameras of the prior art wherein film advance and shutter cocking occur when the movable section is pushed to its inoperative, retracted position. This feature of the camera of this invention takes advantage of the tendency of the user of the camera to exert less force when the viewfinder carrying section is moved to its extended, operative position than when the section is pushed to its retracted, inoperative position. This tendency is present because most people are inherently more cautious in pulling two permanently connected elements apart with great force for fear of breaking their connection. Thus, effective film advancement during movement of the viewfinder carrying section is moved to its extended, operative position than when the section is pushed to its retracted, inoperative position. This tendency is present because most people are inherently more cautious in pulling two permanently connected elements apart with great force for fear of breaking their connection. Thus, effective film advancement during movement of the viewfinder carrying section in its extended position reduces the possibility of overshoot occurring during the film advancing stroke thereof.

In accordance with another feature of the invention, the viewfinder carrying section of the camera is provided with means for preferably removing a film sensing pawl from the film metering aperture as well as cocking the shutter as the viewfinder carrying section is moved to its retracted, inoperative position. Film advance thus occurs during movement of the viewfinder section when the film metering pawl has already been removed from its film perforation. While this result is sometimes achieved in a completely different camera environment by so withdrawing the pawl when the shutter is operated, it is believed that such pawl removal is most simply achieved when accomplished during advancement of the film winding member.

A unique slip clutch and gear train for operating the film winding drive gear constitutes still another feature of the invention.

The above and other features and advantages of the invention will become apparent upon making reference to the specification to follow when taken in conjunction with the accompanying drawings.

DESCRIPTION OF THE DRAWINGS

FIG. 3 is an enlarged fragmentary sectional view taken substantially along line 3—3 of FIG. 1;

FIG. 4 is an enlarged fragmentary sectional view taken substantially along line 4—4 of FIG. 1;

FIG. 5 is an enlarged fragmentary sectional view taken substantially along line 5—5 of FIG. 3;

FIG. 6 is a rear view in elevation of the embodiment of the camera shown in FIG. 1;

DESCRIPTION OF A PREFERRED EMBODIMENT OF THE INVENTION

Figure 1:
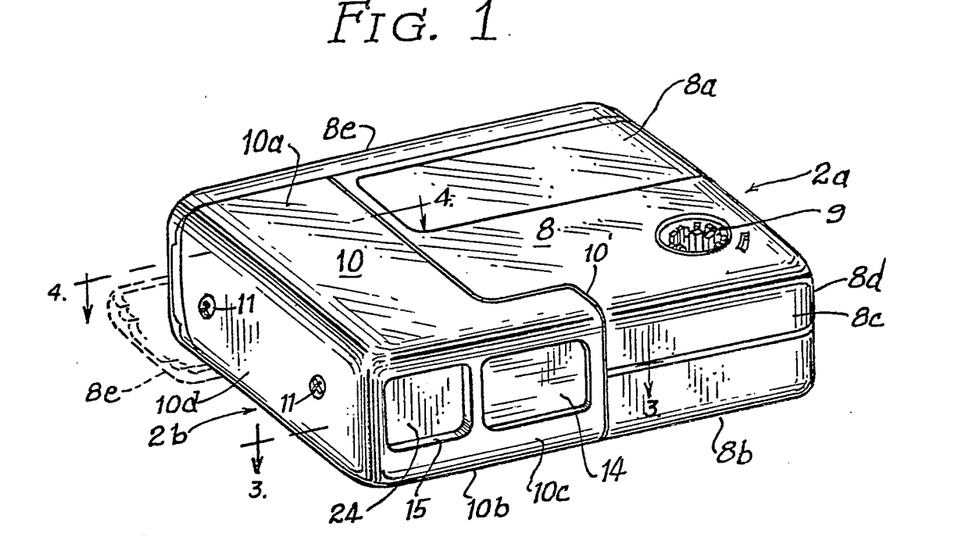
FIG. 1 is a top perspective view of an embodiment of the retractable camera of this invention showing the viewfinder carrying section thereof in its retracted position.
Figure 2:
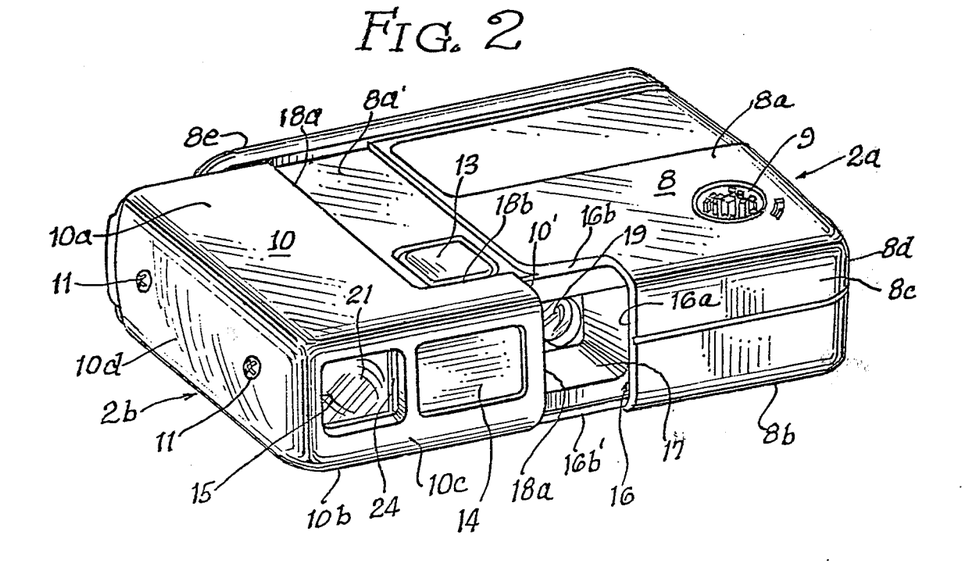
FIG. 2 is a view corresponding to the view of FIG. 1 showing the viewfinder carrying section in its extended, operative position.

Referring, now, more particularly to FIGS. 1 and 2, as there shown, the camera of the present invention, like the camera disclosed in co-pending application Ser. No. 539,986, filed Jan. 10, 1975, comprises a main camera section 2a and a viewfinder carrying section 2b. The main camera and viewfinder carrying sections 2a and 2b, respectively, include sub-assemblies 4 and 6 (see FIG. 7), and associated housings 8 and 10 which are secured by screws such as 11—11 to the associated sub-assemblies. The housing 8 for the main camera section 2a comprises relatively closely spaced top and bottom walls 8a and 8b, a front wall 8c which extends between the front margins of the top and bottom walls 8a and 8b, and an end wall 8d extending between the contiguous margins of the top, bottom and front walls 8a, 8b and 8c. The top, bottom and front walls 8a, 8b and 8c extend horizontally only a fractional part of the overall length of the camera housing. A flash cube socket 9 is exposed through an opening in the top wall 8a. The housing 8 of the main camera section includes a rear cover-forming wall 8e closing off the rear of the camera, which rear wall forms a cover pivotally mounted for movement between the vertical position shown in solid lines in FIGS. 1 and 2 and the dash line position shown in FIG. 1 to expose an opening in the rear of the camera to enable the insertion of a typical 110 camera film cartridge (not shown). The rear cover-forming wall 8e extends for the full length of the camera, unlike the other walls of the housing 8 of the main camera section 2a.

The housing 10 of the viewfinder section 2b includes a top wall 10a which is in generally the same plane as the top wall 8a of the housing 8 of the main section 2a of the camera, a bottom wall 10b which is in approximately the same plane as the bottom wall 8b of the housing of the main section 2a of the camera, a front wall 10c which is approximately in the same plane as the front wall 8c of the housing of the main section 2a of the camera and an end wall 10d which is secured by the screws 11—11 to the sub-assembly 6 of the viewfinder section. A recess 16 is formed in the front wall 8c of the housing 8 of the main section of the camera which recess extends slightly into the upper and bottom walls 8a and 8b thereof to form a laterally facing recessed edge 16a and forwardly facing edges 16b and 16b' (see FIG. 2) which receive in confronting relationship corresponding edges 18a, 18b and 18b' respectively of a projecting portion 10' of the housing 10 of the viewfinder section 2b, formed by the shortening of the top wall 10a of the housing 10 so that the housing sections interleave as shown in FIG. 1. The end wall 10d of the housing 10 of the viewfinder carrying section 2b is then in a position slightly within the outer margin of the pivotally mounted rear wall 8e of the housing 8 of the main section of the camera.

In the retracted position of the viewfinder carrying section 2b, the top wall 10a of the viewfinder carrying section housing covers a manually depressible shutter release button 13 exposed on a downwardly depressed extension 8a' of the top wall 8a of the housing of the main section of the camera. The front wall 10c of the housing 10 of the viewfinder section has a recessed cover-forming portion 14 which together with the adjacent portions of the front wall 10c covers a recess 17 in a preferably plastic molded part 24 of the sub-assembly 4. The recess 17 exposes an objective lens 19 also forming part of the sub-assembly 4. The front wall 10c of the viewfinder carrying section housing 10 thus acts as a dustcover for the objective lens 19.

Laterally positioned adjacent the recessed cover-forming portion 14 of the front wall 10c of the housing 10 is a cut-out portion 15 forming a window which, when the viewfinder carrying section is in its extended position, exposes a front viewfinder lens 21, and when it is in a retracted position, is in front of a cover plate 24 forming part of the plastic molded part 24. The cover plate 24 acts as a dust cover for the front viewfinder lens 21 which passes behind the cover plate 24 when the viewfinder carrying section is in its retracted position. In the retracted position of the viewfinder carrying section, the pivotally mounted rear wall 8e of the housing 8 of the main camera section covers over and acts as a dust shield for a rear viewfinder lens element 23.

Figure 7:
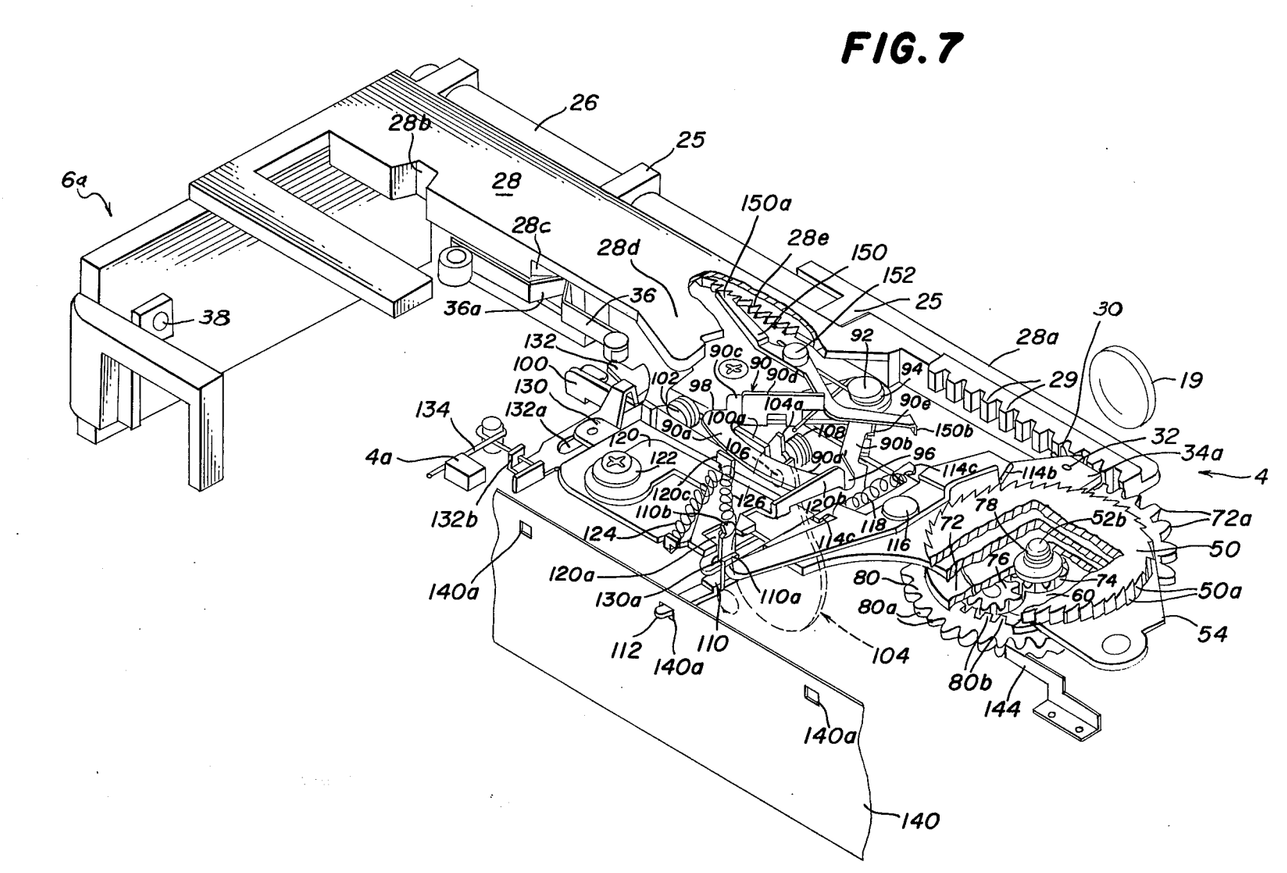
FIG. 7 is a fragmentary view in perspective of said embodiment of the camera as viewed from below with portions of the housing removed to show the relationship of the components of the camera mechanism when the shutter release is in an uncocked position.
Figure 9:
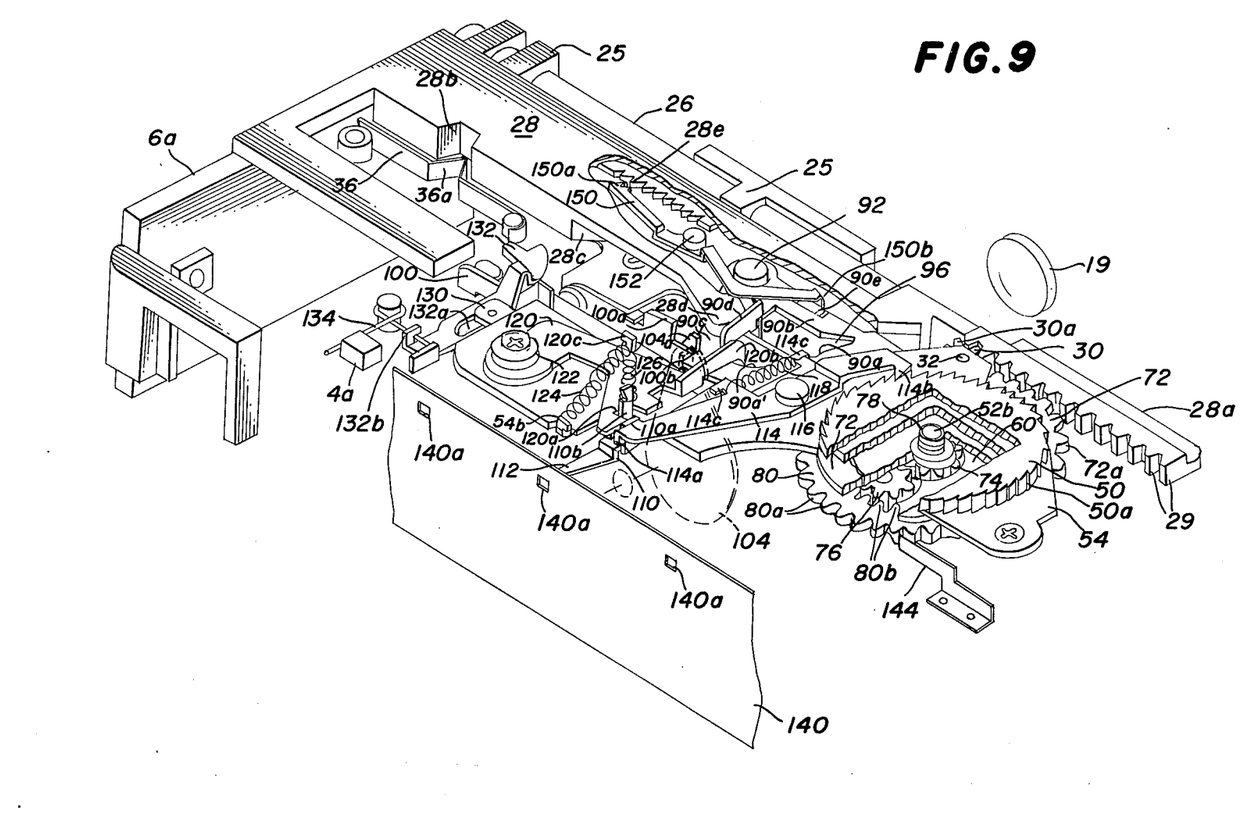
FIG. 9 is a view corresponding to the view of FIG. 7 showing the shutter mechanism in a cocked position.

As best shown in FIGS. 7 and 9, the main camera section sub-assembly 4 includes apertured guide-forming members 25—25 in which is slidably disposed a slide rod 26 forming part of the viewfinder carrying section sub-assembly 6. THe ends of the slide rod 26 are anchored in any suitable way to an actuator plate 28 formed integrally with the sub-assembly 6. The plate 28 has an extension or rack 28a with teeth 29 for engaging the teeth 30a of a gear 30 mounted for rotation about a vertical axis on a pin 32 secured on an extension metal base of a plate. The plate 28 has spaced notches or recesses 28b and 28c formed therein for receiving a V-shaped bend 36a in a detent spring 36. The bend 36a enters the notches 28b and 28c when the viewfinder carrying section is in its retracted and extended positions, respectively.

As shown, the actuator plate 28 is joined to a vertical end wall 6a of the sub-assembly 6. The end wall 6a has threaded apertures 38—38 which receive the screws 11—11 for anchoring the viewfinder carrying section housing 10 to the sub-assembly 6. The wall 6a terminates at its forward end in a transversely extending front wall 6b in which the forward viewfinder lens 21 is mounted. In the retracted position of the viewfinder carrying section, the front wall 6b moves behind the cover plate 24 forming part of the main camera section sub-assembly 4. The rear end of the vertical wall 6a terminates in a lens holding portion 40 which holds the rear viewfinder lens 23. When the viewfinder carrying section 2b is in its retracted position, the lens holding portion 40 moves behind a portion 42 (FIG. 4) of the rear cover-forming wall 8e of the main camera section housing 8. In its retracted position, the line holding portion of the viewfinder carrying section 2b of the camera blocks the passage of the film cartridge through the rear opening of the housing 8 of the main camera section. Therefore, to insert a film cartridge within the camera, it is necessary to move the viewfinder carrying section 2b into its extended position which moves the lens holding portion 40 laterally to one side of the main camera section 2a to remove the obstruction to the passage of the film cartridge through the rear of the camera housing 8 after the rear housing wall 8e is pivoted into a horizontal position. The rear wall 8e has a releasable latch (not shown) which is released by depression of a lever 41 on the rear wall 8e (see FIG. 6). As also shown in FIG. 6, the rear has a window 43 through which a number is visible on the film cartridge indicating the particular film frame which is in position for exposure.

In the extended position of the viewfinder carrying section, the front and rear lenses 21 and 23 of the viewfinder carrying section 2b are unobstructed so that the viewer can view the scene to be photographed. The view through these lens elements is obstructed by the cover plate 24 and the rear housing wall 8e when the viewfinder carrying section is in its retracted position. As previously indicated, in the retracted position of the viewfinder carrying section all light passing surfaces on which dust can accumulate are covered over by the various cover elements previously described and the shutter release button 13 is covered so that an accidental exposure is not possible.

Referring, now, in greater detail to FIGS. 7–14 of the drawings, the teeth 30a of a gear 30 (FIG. 10) actuate a film advancing gear train and clutch system of the camera mechanism in reponse to the reciprocating movement of the viewfinder carrying section 2b by a user of the camera. As best illustrated in FIGS. 10 to 14, the gear train and clutch system of the camera comprises a ratchet wheel 50 having a plurality of teeth 50a formed along its outer edge. Joined to the upper surface of the wheel 50, at the center thereof, is an extension or shaft 52 having a base portion 52a to the outer end of which is joined a reduced gear-retaining portion 52b. A base plate 54, having an opening 54a therethrough for receiving the base portion 52a of the shaft 52, is positioned on the upper surface of the racket wheel 50.

Figure 10:
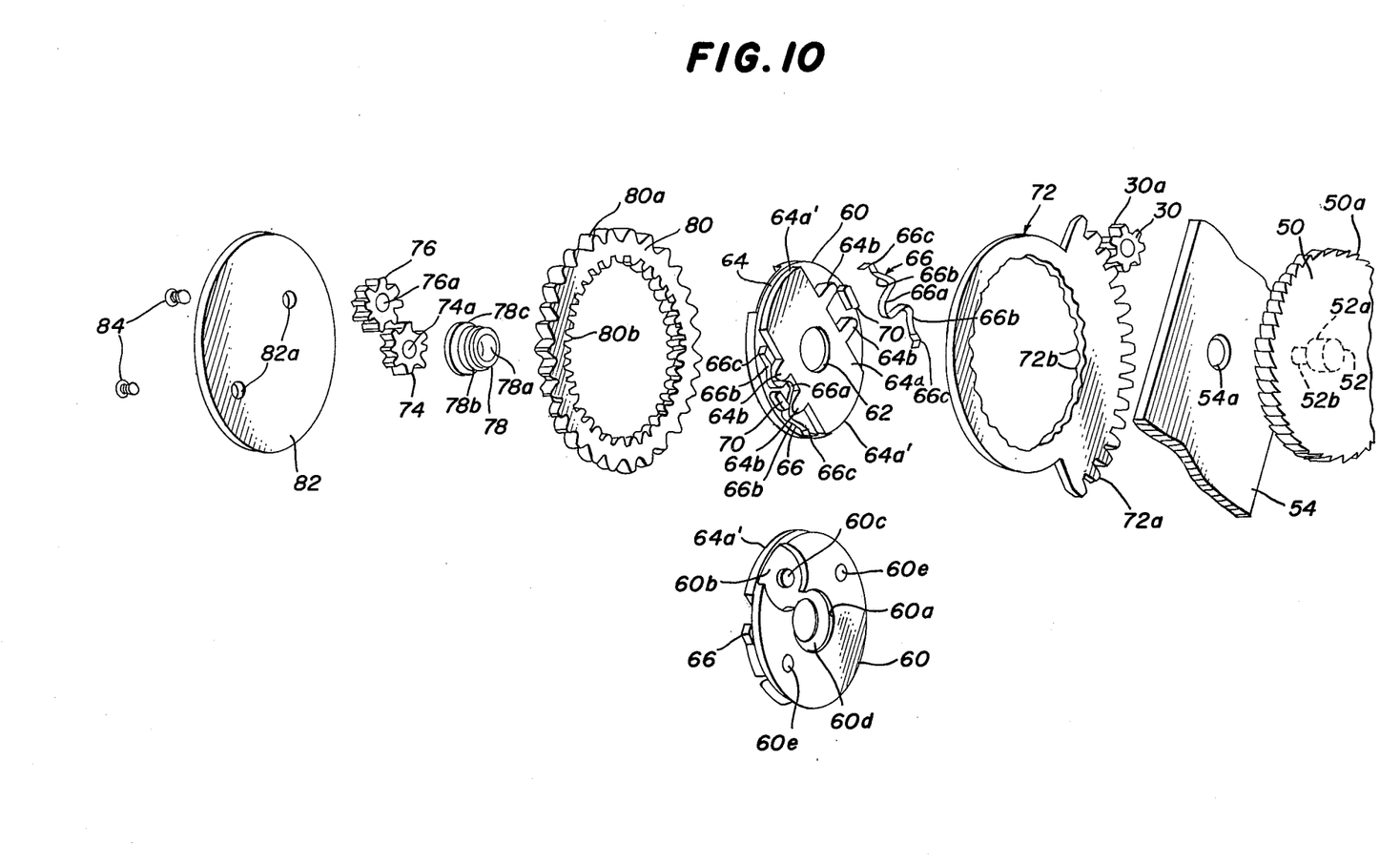
FIG. 10 is an enlarged exploded view of the components of the gear train and clutch assembly of said embodiment of the camera.
Figure 11:
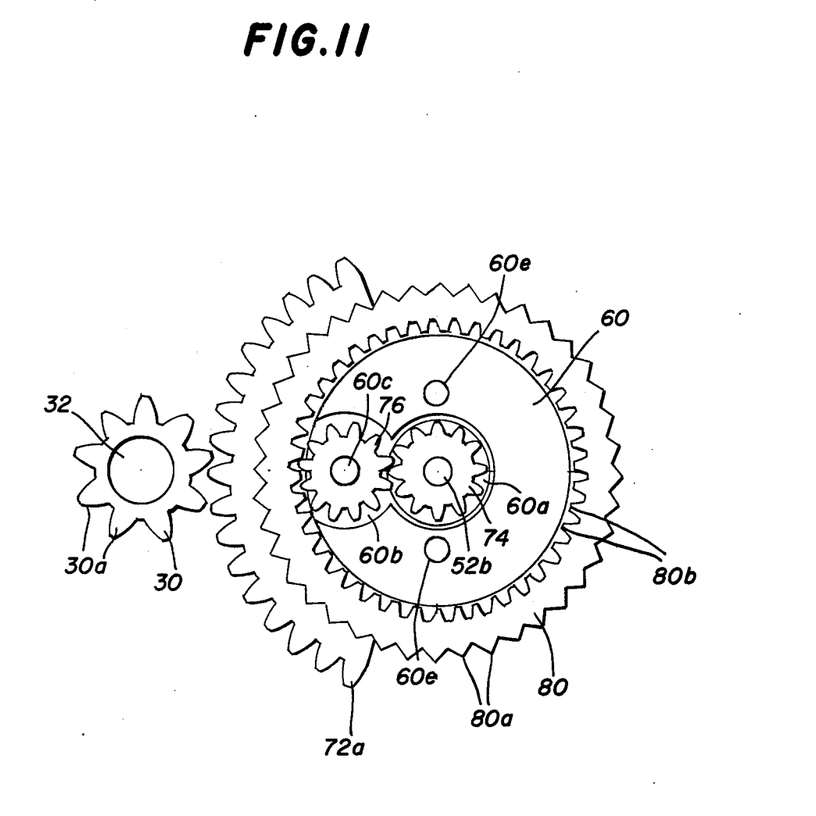
FIG. 11 is an enlarged plan view of components of the gear train and clutch assembly as viewed from above with the top cover plate removed.
Figure 12:
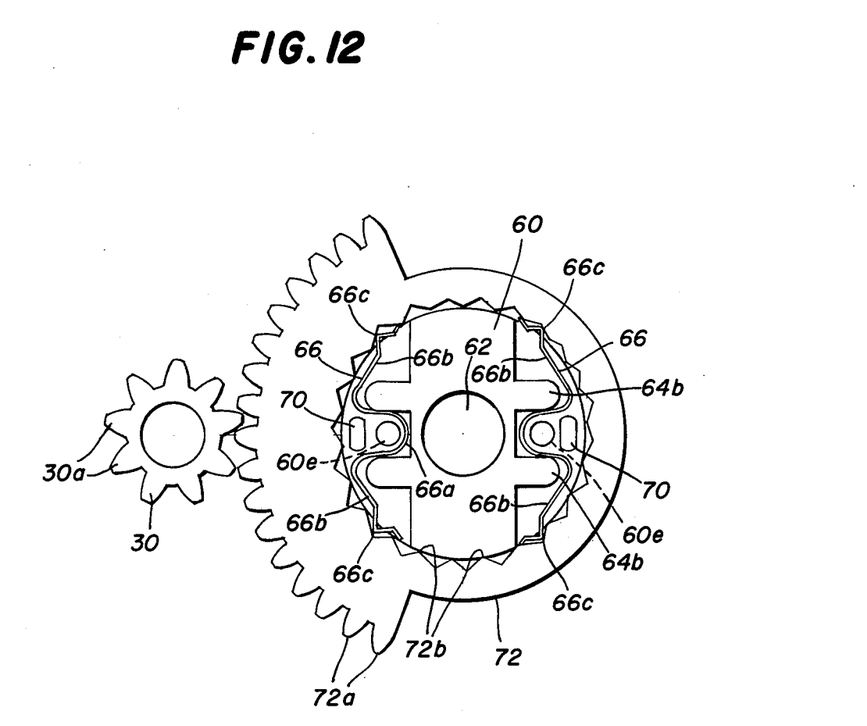
FIG. 12 is an enlarged plan view of components of the gear train and clutch assembly as viewed from below with certain components removed to show details of the hub of the clutch assembly.
Figure 13:
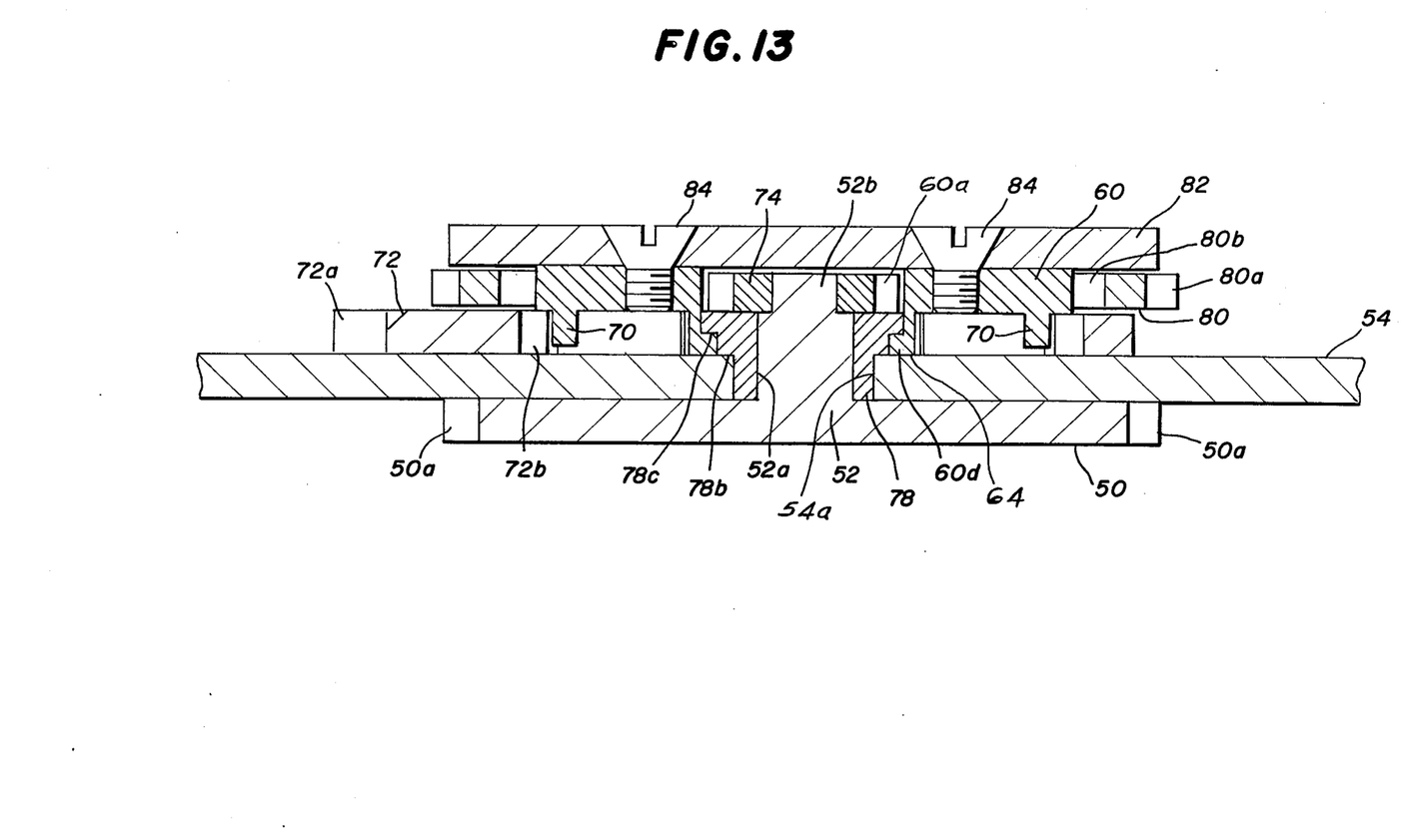
FIG. 13 is an enlarged sectional view through the gear train and clutch assembly.
Figure 14:
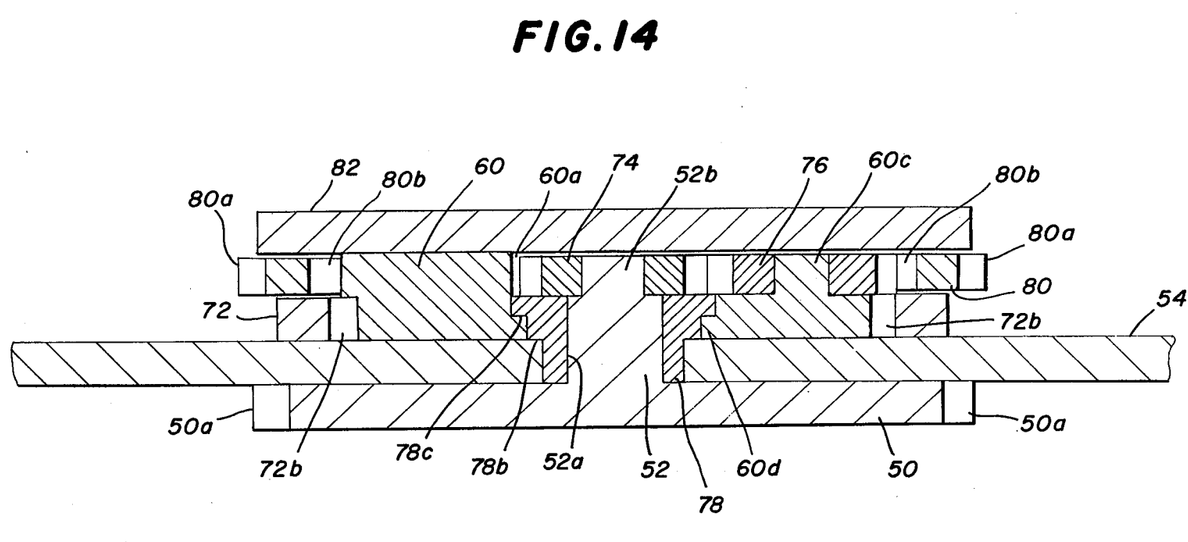
FIG. 14 is a view corresponding to the view of FIG. 13 taken at an angle of 90° thereto.

The plate 54 is adapted to support a clutch assembly which includes a drive disc or hub member 60. The member 60 has a centrally located opening 62 therethrough, and is formed on its lower surface to provide a seat 64 comprising an elongated, rectangularly shaped portion 64a, the ends of 64a'—64a' of which terminate inwardly of the outer edge of the member 60, and have a radius of curvature corresponding to that of the periphery of the member 60. The sides of the portion 64a each have a pair of spaced, laterally extending clutch spring seat forming portions 64b—64b for receiving clutch springs 66—66. Diametrically opposed guide portions 70—70 are formed on the lower surface of the member 60, inwardly of the outer edge of the member 60, and between, but in spaced relation to, the ends of the seat forming portions 64b—64b. The springs 66—66, as shown each have a central, inwardly bent portion 66a which is adapted to be positioned between the seat forming portions 64b—64b, and outwardly extending end portions 66b—66b, each of which is provided with a tooth-shaped bend 66c—66c.

The lower surface of the member 60 provides a seat for a ring-shaped transmission gear 72. The gear 72 has external teeth 72a formed along a portion of its outer periphery, and is provided with a plurality of evenly spaced inner teeth 72b along its inner edge. The teeth 72a of the gear 72 engage with the teeth 30a of the gear 30, while the teeth 72b of the gear 72 engage with the teeth-like bends 66c—66c in the clutch springs 66—66.

The upper surface of the hub membr 60 is formed with a central recess 60a for receiving a sun gear 74 having an opening 74a therethrough in which the reduced end portion 52b of the extension 52 on the wheel 50 is secured. A second recess 60b is provided adjacent to the recess 60a for receiving a planetary gear 76. The recess 60b tangentially intersects the recess 60a to enable the teeth of the gear 76 to engage with the gear 74, and is provided with a central, circular extension 60c which is received in an opening 76a through the gear 76.

A collar 78, having a bore 78a therethrough, receives the base portion 52a of the extension 52 on the ratchet wheel 50. The base of the collar 78 abuts the gear 74, and the outer wall thereof is stepped to enable the inner end thereof to pass through the opening 54a in the plate 54 and rest against the inner surface of the ratchet wheel 50, and to enable a portion of the outer end thereof to pass through the opening 62 in the hub member 60. The stepped configuration of the outer wall of the collar 78 provides an inner shoulder 78b which abuts the plate 54, and an outer shoulder 78c which is in engagement with an annular, inwardly extending lip 60d formed in the member 60 at the opening 62 therethrough.

The member 60 is positioned within a ring-like film winding gear 80 having outer teeth 80a and inner teeth 80b. The outer teeth 80a are adapted to engage the teeth of the gear in a film cartridge or cassette (not shown) whereby film winding takes place. The inner teeth 80b of the gear 80 engage with the teeth of the planetary gear 76. The gear 80 is maintained in operative relation with respect to the hub member 60 by a cover plate 82 having countersunk bores 82a—82a therethrough for receiving screws 84—84 which are engaged in tapped bores 60e—60e formed in the hub member 60.

Figure 8:
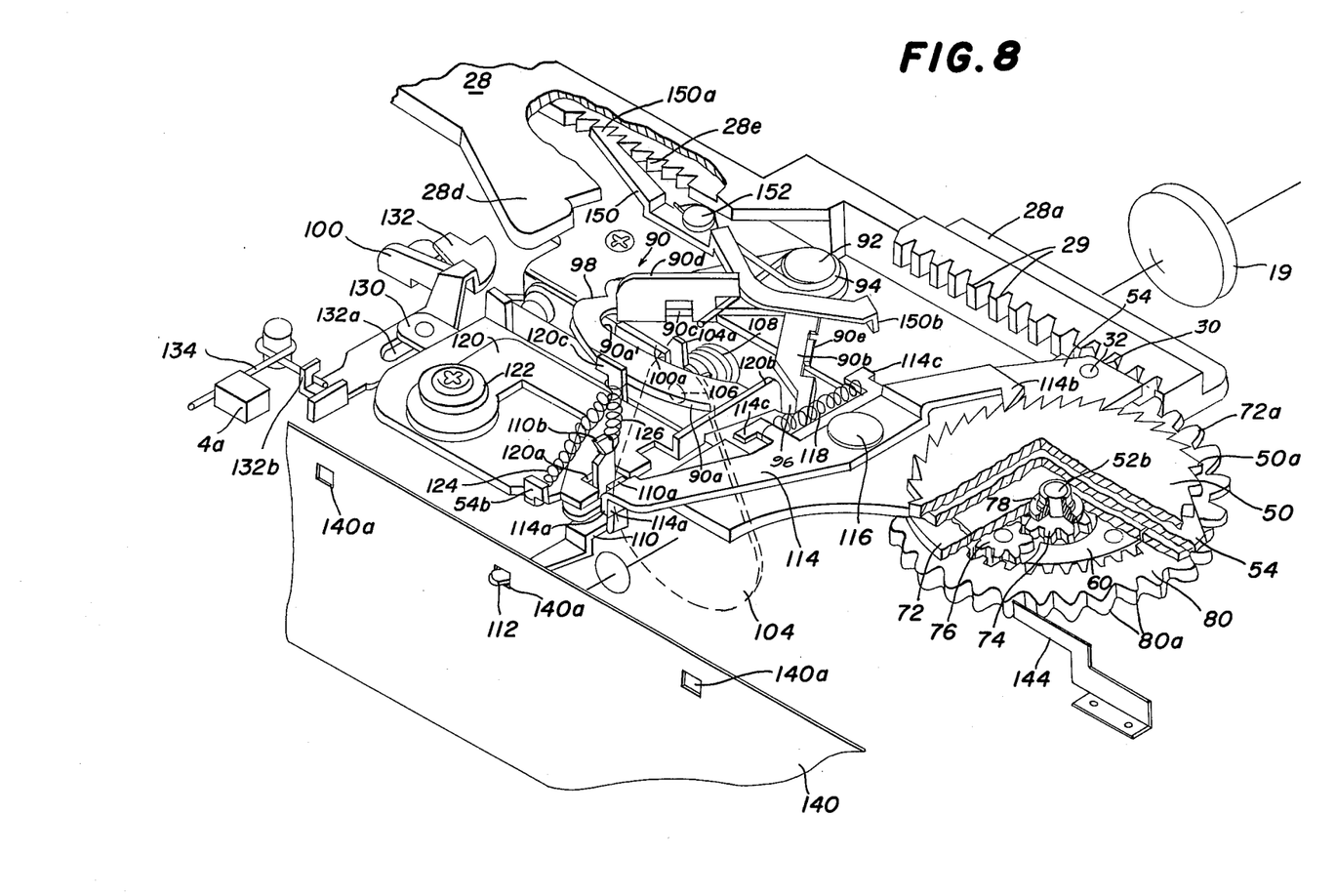
FIG. 8 is an enlarged fragmentary view corresponding to the view of FIG. 7.

As best illustrated in FIGS. 7, 8 and 9 of the drawings, the actuator plate 28 has an extension 28d adapted to engage a shutter cocking transmission member 90 when the viewfinder carrying section 2b is moved to its retracted position. The shutter cocking transmission member 90 pivots on a pin 92, and is urged to its normally uncocked position by a spring 94 carried on the pin 92. The member 90, as shown, is comprised of three legs 90a, 90b and 90c which intersect with one another to impart a generally triangular configuration to the member 90. The leg 90a of the member 90 is curved slightly outwardly and has a curved inner margin 90a', the function of which will become clear as the description proceeds. The leg 90b intersects with the leg 90a and forms therewith a generally V-shaped recess 96, the function of which will also become clear as the description proceeds. The leg 90c of the member 90 carries a downwardly extending tab 90d which is engaged by the extension 28d on the actuator plate 28. The tab 90d has a notch at its outer end for receiving an arm of the spring 94. At the intersection of the leg 90a with the leg 90c, the end of the leg 90a forms a stop 98.

Positioned above and adjacent to the shutter cocking transmission member 90 is shutter release member 100. The member 100 is mounted for pivotal movement in relation to the transmission member 90 by a pin 102, and has an extension 100a against the lower edge of which the leg 90c of the member 90 abuts as the member 90 is moved by the extension 28d of the actuator member 28. The member 100 also is provided with a stop-engaging tab 100b which engages the stop 98 of the member 90 when the latter is in a fully cocked position.

A shutter blade 104, pivotally mounted on a pin 106, is positioned in operative relation to the transmission member 90. The blade 104 has a downwardly extending projection 104a which is struck by the leg 90c of the member 90, when the latter is released by depression of the shutter release button 13, causing the shutter blade 104 to move in a direction to enable pictureforming light rays to pass through the objective lens 19 to the film. The blade 104 is returned to a closed position with relation to the lens 19 by a spring 108 mounted on the pin 106.

As previously explained, the minimizing or prevention of overshoot is achieved with the camera of the present invention mainly by the fact that the film winding operation is carried out when the viewfinder carrying section of the housing onto which actuator member 28 is attached is moved to its extended position, since the user is then more likely to use less force and speed of movement of the viewfinder carrying section of the camera than when moving the same to its retracted position. This feature also separates the shutter cocking and film winding operations, and simplifies the design of the camera operating and film winding mechanism now being described.

Film indexing a distance of one frame is achieved by the one time movement of the viewfinder section of the camera to its extended position. Film winding takes place during only a portion of this movement and film movement terminates when a film sensing finger 110 having a sensing and arresting pawl 112 provided thereon enters one of the film metering perforations 140a spaced one frame distance apart on the film 140. The film sensing finger 110 has a tab 110a for engaging an extension 114a formed at one end of a stroke lever 14. The lever 114 is mounted for rotation on the plate 54 by a pin 116, and is provided at its other end with a pawl 114b for engaging the teeth 50a of the ratchet wheel 50. A pair of spaced, inwardly extending hooked, spring retaining posts 114c—114c are provided on the lever 114 for receiving a compression spring 118 which acts to normally maintain the pawl 114b in engagement with the teeth 50a of the ratchet wheel 50. The finger 110 also has a spring retaining tab 110b which is positioned in a notch 120a formed in one side of a sensing lever 120. The lever 120 is mounted for rotation on a pin 122 secured in an extension of the plate 54. The lever 120 has an inwardly extending hooked sensing pawl 120b formed at the distal end thereof which is adapted to move along the camming edge 90a' of the leg 90a of the cocking transmission member 90. The lever 120 also is provided with a spring retaining post 120c which receives an end of a compression spring 124, the other end of which is anchored to a post 54b formed on the plate 54. The post 120c also receives one end of a compression spring 126, the other end of which is secured to the tab 110b of the sensing finger 110.

On the side of the extension of the plate 54 on which the lever 120 is positioned there is a connecting lever 130 having a slot 130a formed in one end thereof through which extends the spring retaining tab 110b of the finger 110. The other end of the lever 130 is slidably secured in a slot 132a formed in a film cartridge or cassette sensing lever 132. The lever 132 moves against the bias of a spring 134, one end of which is retained in a hooked post 132b formed on the lever 132, and the other end of which abuts a projection 4a formed on the support frame.

Before a film cartridge or cassette is inserted into the camera, the pawl 112 on the film sensing finger 110 is in its extended or "out" position due to the force exerted by the compression spring 124 upon the pivotal sensing lever 120. This force is transmitted to the pawl 112 through contact with the spring retaining tab 110b on the pivotal finger 110 by the innermost wall of the notch 120a in the lever 120. In addition, the pawl 112 is maintained at its extreme left (as viewed in FIG. 7), or film perforation engaging position by the force exerted by the compression spring 126 on the tab 110b. This same force moves the tab 110a away from the extension 114a of the stroke lever 114. As a result, the pawl 114b, by the action of the compression spring 118, is maintained in engagement with the teeth 50a of the ratchet wheel 50.

As indicated, a film cartridge or cassette can only be loaded into the camera when the viewfinder carrying section 2b is in its fully extended position. After a cassette has been loaded into the camera, the film 140 carried by the cassette presses against the pawl 112, if the pawl is not opposite a film perforation 140a, and forces the sensing finger 110 inward against the force of the compression spring 120 which causes lever 120 carrying the spring 124 to pivot slightly about pin 122. With the insertion of the film cassette into the main camera section 2a, the film winding gear 80 engages a gear (not shown) in the film cassette. The pawl 114b of the stroke lever 114 will movably engage with the teeth 50a of the ratchet wheel 50 to permit a film winding operation.

As just indicated, the pawl 112 of the film sensing finger does not, upon initial loading of the flm cassette in the camera, generally fall into a perforation 140a in the film 140. As the viewfinder carrying section 2b of the camera is pushed to its retracted position, the extension 28d on the actuator plate 28 engages the extension 90d on the transmission member 90, causing the member 90 to pivot on the pin 92. When the stop 98 clears the tab 100b on the shutter release arm 100, the tab 100b moves down and engages the stop 98, thereby preventing the member 90 from returning to its normally uncocked position. The member 90, thus, is in a "cocked" position.

As the transmission member 90 is moved to its cocked position, the hooked sensing pawl 120b of lever 120 follows the profile of the curved camming edge 90a' of the leg 90a of the member 90. Normally, the beginning of the cocking stroke of the section 2b will withdraw the film sensing pawl 112 from a perforation 140a of the film 140. As the member 90 is moved further toward its cocked position, the pawl 120b and the film sensing finger tab 110b controlled thereby are further drawn by the edge 90a' in a direction away from the film 140. At this stage, the film sensing finger pawl 112 does not make contact with the film 140. Near the end of the cocking stroke, the lever 120 pivots outwardly slightly on the pin 122 as the pawl 120b follows the contour of the camming edge 90a'. The pawl 120b thereupon rides on the outer surface of the leg 90a and is disengaged from the edge 90a' and is pulled in the direction of the film 140 by the compression spring 124 which moves the film sensing finger 110 in the same direction, so the film sensing pawl 112 makes contact with that portion of the film 140 that has no perforation 140a.

At the same time that the extension 28d of the plate 28 is moving the member 90 to its cocked position, the teeth 29 on the rack 28a are rotating the gear 30 in a clockwise direction as viewed in FIG. 8. Since the teeth 30a of the gear 30 are engaged with the teeth 72a of the transmission gear 72, the gear 72 moves in a counterclockwise direction. However, this rotation of the gear 72 does not rotate film winding gear 80 because it is held against counterclockwise rotation by a spring pawl 144 (FIG. 8).

Under normal conditions of cocking the member 90 and film winding, the clutch hub 60 and gear 72 move together. The rotation of the clutch hub 60 is necessary to rotate film winding gear 80 because the gear 76 carried by the hub engages the internal teeth of the gear 80. However, rotation of gear 76 can only impart a rotating force on gear 80 if gear 74 meshing with gear 80 is held against rotation. This occurs only when ratchet wheel 50 to which gear 74 is secured is locked against clockwise rotation by pawl 114b. The clutch hub 60 will slip with regard to the gear 72 (that is, the teeth 66c—66c of the two clutch springs 66—66 will slip along the internal teeth 72b of the gear 72) when the gear 80, being driven in a clockwise direction during a film winding operation has applied to it a substantial rotation restraining force caused by the unwinding of all the film in the cassette. Moreover, when the viewfinder carrying section 2b is moved to a retracted position, the ratchet wheel 50 is free to move in the counterclockwise direction where it is driven by the rotation of gear 76 rotating along the internal teeth of gear 80 held against rotation by pawl 144.

To ensure full shutter cocking, film sensing pawl removal and a full one frame film winding operation to take place in a single reciprocation of the viewfinder carrying section, it is necessary to prevent outward movement of the viewfinder carrying section 2b until full completion of the cocking stroke. To this end, a stop lever 150 is provided. The lever 150 is mounted for pivotal movement on a pin 152, and has a pawl 150a at one end thereof for engaging ratchet teeth 28e integrally formed on the actuator plate 28. A sensing tab 150b is provided at the other end of the lever 150 which is engaged by an extension 90e formed on the leg 90b of the transmission member 90. Release of the pawl 150a from the ratchet teeth 28e occurs when extension 90e on the member 90 engages the tab 150b at the end of the cocking stroke of the viewfinder carrying section 2b.

Film advance occurs in the camera of the present invention when the viewfinder carrying section 2b is moved from a fully retracted position to its extended position as shown in FIG. 2. As the section 2b is being moved to its extended position, the teeth 29 on the rack 28a rotate the gear 30 in a counterclockwise direction and the gear 72 in a clockwise direction. Since the pawl 114b of the stroke lever 114 is engaged with the teeth 50a of the ratchet wheel 50, clockwise rotation of the ratchet wheel cannot occur. As a result, clockwise rotation of the gear 72, the hub member 60 and the planetary gear 76 takes place. The gear 76 then can drive the film winding gear 80 as it rotates around the locked gear 76. The film 140 is thus advanced to the next frame.

As the film 140 is advanced by the rotation of the gear 80, the pawl 112 on the film sensing finger 110 falls, due to the force of the compression spring 124, into a film perforation 140a. The pawl 112 moves with the film 140 as it is advanced by the gear 80. This movement of the pawl 112 is transmitted to the entire sensing finger 110, including the tab 110a. Movement of the tab 110a against the extension 114a of the lever 114 acts to disengage the pawl 114b from the teeth 50a of the ratchet wheel 50. As soon as this occurs, rotation of the ratchet wheel 50 can take place, and film advance ceases. With the pawl 114b in its disengaged position, any further movement of the section 2b in either direction would not cause further winding of film. By thus causing the pawl 112 to enter a perforation 140a in film 140 near the end of the film advancing stroke of the section 2b, film movement is retarded, and precisely and positively controlled in a manner such that no overshoot occurs during winding.

When the shutter release member 100 is depressed by downward pressure exerted by the user on the shutter release button 13, the tab 100b of the member 100 is moved inwardly, out of engagement with the stop 98 of the member 90. The member 90 thereupon is urged by the spring 94 in a direction which will place it in an uncocked position. As the member 90 moves, it strikes the projection 104a on the shutter blade 104, and exposure occurs. As soon as the stop 98 moves away from the tab 100b, a coil spring (not shown) on the release member 100 urges the tab 100b against the leg 90a of the transmission member 90. As a result, the entire member 90 pivots slightly outwardly on pin 92. The hooked sensing pawl 120b thereupon follows the contour of the inner camming edge 90a' of the leg 90a until it reaches the generally V-shaped recess 96. With the sensing pawl 120b in this position, the pawl 112 on the film sensing finger 110 is in its extended condition, as shown in FIG. 9, due to the force exerted on the pivotal lever 120 by the compression spring 124.

It should be understood that various modifications may be made in the preferred embodiment of the invention described without deviating from the broader aspects of the invention.

I claim:

1. In a camera having a main camera section with an objective lens window exposing a light receiving surface for receiving picture-forming light rays which expose the film upon operation of camera shutter mechanism and a manually operable shutter release member, the improvement comprising a viewfinder section having front and rear normally exposed light receiving surfaces which present to the user a view of the scene to be photographed by the camera, said viewfinder section being mounted on said main housing section for movement between a retracted inoperative position, where the main housing section and viewfinder section form an overall assembly of maximum compactness, and an extended position where the viewfinder section is in an operative position to provide a view of the scene to be photographed said main camera section housing dust cover-forming means for providing a dust cover for said front and rear light receiving surfaces of said viewfinder section when said viewfinder section is in said retracted position and for exposing the same when the viewfinder section is in said extended position, and said viewfinder section having means for covering said shutter release member when said viewfinder section is in said retracted position and for exposing the same when the viewfinder section is in said extended position.

2. The camera of claim 1 wherein said viewfinder section has dust cover-forming means for providing a dust cover for said light receiving surface of said objective lens window of said main camera section when said viewfinder section is in said retracted position and for exposing the same when the viewfinder section is in said extended position.

3. The camera of claim 1 wherein said main camera section has film winding mechanism which advances the film one frame distance, and said viewfinder section including means which impart movement to said film winding mechanism when said viewfinder assembly is moved between said positions.

4. In a camera having a main section with an objective lens window exposing a light receiving surface for receiving picture-forming light rays which expose the film upon operation of camera shutter mechanism, the improvement comprising a viewfinder section having front and rear normally exposed light receiving surfaces which present to the user a view of the scene to be photographed by the camera, said viewfinder section being mounted on said main housing section for movement between a retracted inoperative position, where the main housing section and viewfinder assembly form an overall assembly of maximum compactness, and an extended position where the viewfinder is in a position to provide a view of the scene to be photographed, said main camera section housing dust cover-forming means for providing a dust cover for said front and rear light receiving surfaces of said viewfinder section when said viewfinder section is in said retracted position and for exposing the same when the viewfinder section is in said extended position, and said viewfinder section having dust cover-forming means for providing a dust cover for said light receiving surface of said objective lens window of said main camera section when said viewfinder section is in said retracted position and for exposing the same when the viewfinder section is in said extended position.

5. The camera of claim 4 wherein said main camera section has film winding mechanism which advances the film one frame distance, and said viewfinder section including means which impart movement to said film winding mechanism when said viewfinder assembly is moved between said positions.

6. In a pocket sized still camera having a horizontally elongated main housing enclosing most of the components of a camera and formed by top and bottom walls, vertical front and rear walls extending between the front and rear margins of said top and bottom walls, said vertical rear wall being movable between a housing closing position and a housing uncovering position when a film cartridge can be inserted into a cartridge-receiving compartment in the main housing, and an end wall extending between one side margin of the top, bottom, front and rear walls, the top and bottom walls of the main housing being closely spaced relative to the front to back dimensions thereof, to provide a relatively thin and narrow camera housing which can be readily placed in a shirt pocket when oriented so the longitudinal axis thereof is vertically oriented, said front wall having adjacent thereto an objective lens window therein for receiving picture-forming light rays and which has an exposed transparent surface on which dust can accumulate, the improvement wherein the side margin of said main housing opposite the one including said end wall having mounted thereat for horizontal sliding movement on said main housing a viewfinder assembly, said viewfinder assembly being mounted for movement between a retracted position where it is retracted to a point adjacent the end margin of said vertical rear wall of said main camera housing and provides an overall relatively compact assembly and an operative extended position where it extends horizontally substantially beyond said end margin of said vertical rear wall, said viewfinder assembly having a housing including a front wall with an inner dust cover-forming portion which covers over and acts as a dust shield for said transparent surface of said objective lens window to prevent the build-up of dust thereon, and an outer portion with an opening therein, said viewfinder assembly having means supporting a rear lens element located between said rear wall and said cartridge-receiving compartment so it is covered over by said rear wall of said main housing when the viewfinder assembly is in its retracted position and is exposed to be placed next to the viewer's eye when the viewfinder assembly is in its extended position, the viewfinder assembly having a front lens element which is exposed through said opening in said front wall of said viewfinder assembly housing, and there is associated with said main housing a dust cover-forming wall behind which said front viewfinder lens element of said viewfinder assembly extends when the viewfinder assembly is in its retracted position.

7. In a retractable camera having a main section on which is mounted substantially all of the camera mechanism, including shutter operating mechanism which, when released from a cocked position when a picture is taken operates the camera shutter, and which includes a film cartridge-receiving means for receiving a film cartridge including film with film metering perforations therein spaced one frame distance apart and film moving means for engaging the film to impart movement thereto, said main section of the camera having driving means to be coupled to said film moving means in said cartridge, said main section of the camera further including a film perforation sensing member movably urged toward the path of movement of the film metering perforations of said film, film advance terminating the movement of said drive means, said camera further having a viewfinder carrying section mounted on the main camera section for movement between a retracted non-picture taking position and an extended picture taking position, the improvement comprising: film wind actuating means on said viewfinder carrying section of the camera and film advancing mechanism in said main section of the camera responsive to movement of said film wind actuating means on said viewfinder carrying section only when said viewfinder section of the housing is moved to said extended picture taking position to operate said drive means to initiate a film winding operation, and shutter operating mechanism cocking and sensing member withdrawing means on said main section of the camera for cocking said shutter operating mechanism and removing said sensing member from a film metering perforation to enable the sensing member to engage the film at a point behind the latter perforation before a subsequent movement of said viewfinder carrying section of the camera into said extended picture taking position, said film sensing member withdrawing means includes means being responsive only to the movement of said viewfinder carrying section toward said retracted non-picture taking position for effecting said sensing member withdrawing operation.

8. The retractable camera of claim 7 wherein said shutter operating mechanism cocking means includes means responsive only to the movement of said viewfinder carrying section toward said retracted non-picture taking position for cocking said shutter operating mechanism.

9. The retractable camera of claim 7 wherein said viewfinder carrying section of the camera includes ratchet teeth, said main section of the housing including ratchet pawl means engageable with said ratchet teeth and when engaged with said ratchet teeth prevents the viewfinder carrying section from being moved in the direction of said extended position but permits the viewfinder carrying section to be moved to said retracted position, and means for removing said ratchet pawl means from said rack of said viewfinder carrying section of the camera when said shutter operating mechanism has been cocked by movement of said viewfinder carrying section to said retracted non-picture taking position, said ratchet pawl means remaining in said position when it is disengaged from said rack until said shutter operating mechanism is uncocked.

10. The retractable camera of claim 9 wherein said viewfinder carrying section of the camera includes a frame member having a portion forming said ratchet teeth, a portion forming a part of the shutter operting mechanism to cock the same when the viewfinder carrying section is moved from its extended to its retracted position, and a film winding rack, the main section of the camera including gear means engaged by said rack on said frame member of the viewfinder carrying section, said film advancing mechanism including means responsive to the rotation of said gear means only in a direction in which it is rotated when said viewfinder carrying section is moved from said retracted position toward said extended position.

11. The retractable camera of claim 7 wherein said shutter operating mechanism includes a cocking transmission member having a cam surface thereon, follower means riding along said cam surface, said follower means being connected to said film perforation sensing member so the film perforation sensing member is withdrawn from the film perforation so it engages a point on the film behind said perforation when the cocking transmission member is moved toward said cocked position.

12. The retractable camera of claim 7 wherein said viewfinder carrying section is operative to display a view of the scene to be photographed when said viewfinder carrying section is in said extended position but is disabled from showing a view of the scene to be photographed when the viewfinder carrying section is in said retracted position.

13. In a retractable camera having a main section of which is mounted substantially all of the camera mechanism, including shutter operating mechanism which, when released from a cocked position when a picture is taken, operates the camera shutter, and which includes film cartridge-receiving means for receiving a film cartridge including film with film metering perforations therein spaced one frame distance apart and film moving means for engaging the film to impart movement thereto, said main section of the camera having driving means to be coupled to said film moving means in said cartridge, said main section of the camera further including a film perforation sensing member movably urged toward the path of movement of the film metering perforations of said film, film advance terminating means responsive to the movement of said film perforation sensing member into a given position in a film metering perforation by terminating the movement of said drive means, said camera further having a viewfinder carrying section mounted on the main camera section for movement between a retracted non-picture taking position and an extended picture taking position, the improvement comprising: film wind actuating means on said viewfinder carrying section of the camera and film advancing mechanism in said main section of the camer responsive to movement of said film wind actuating means on said viewfinder carrying section only when said viewfinder section of the housing is moved to said extended picture taking position to operate said drive means to initiate a film winding operation, and shutter operating mechanism cocking and sensing member withdrawing means on said main section of the camera for cocking said shutter operating mechanism and removing said sensing member from a film metering perforation to enable the sensing member to engage the film at a point behind the latter perforation before a subsequent movement of said viewfinder carrying section of the camera into said extended picture taking position, said shutter operating mechanism cocking means includes means being responsive only to the movement of said viewfinder carrying section toward said retracted non-picture taking position for cocking said shutting operating mechanism.

14. The retractable camera of claim 13 wherein said first gear means and slip clutch means are mounted for rotation about a common axis of rotation with said first gear means, said first gear means has a central circular opening lined with said teeth, and said slip clutch means has a recess therein in which is rotatably mounted at least one of said additional gear means.

15. The retractable camera of claim 14 wherein said slip clutch has an eccentrically located recess in which said eccentrically mounted gear means is held for guided rotation therein.

16. The retractable camera of claim 15 wherein said slip clutch additionally has a central recess in which said centrally mounted gear means is mounted and guided for rotation.

17. In a retractable camera having a main section on which is mounted substantially all of the camera mechanism, including shutter operating mechanism which, when released from a cocked position when a picture is taken, operates the camera shutter, and which further includes cartridge-receiving means for receiving a film cartridge including film with film metering perforations therein spaced one frame distance apart and film moving means for engaging the film to impart movement thereto, said main section of the camera having drive means to be coupled to said film moving means in said cartridge, said main section of the camera further including a film perforation sensing member movably urged toward the path of movement of the film metering perforations of said film, film advance terminating means responsive to the movement of said film peforation sensing member into a given position in a film metering perforation by terminating the movement of said drive means, sensing member withdrawing means on said main section of the camera for cocking said shutter operating mechanism and removing said sensing member from a film metering perforation to enable the sensing member to engage the film at a point behind the latter perforation before a subsequent film winding operation, said camera further having a reciprocable section mounted on the main camera section for movement between a retracted position and an extended position, the improvement comprising: film wind actuating means on said reciprocable section of the camera, and film advancing and slip clutch mechanism on said main section of the camera and coupled between said film wind actuating means on said viewfinder carrying section and said drive means on said main section of the camera, said film advancing and slip clutch mechanism comprising first gear means responsive to movement of said film wind actuating means and movable in one direction and the other respectively by reciprocation of said reciprocable section in one direction and the other between said retracted and extended position, said first gear means including teeth, slip clutch means coupled for movement with said first gear means and including resilient flexible means having projecting means engaging with said teeth of said first gear means, said projecting means of said resilient flexible means being in non-slipping relation with the teeth as long as there is no end of film restraining force on said drive means, and additional gear and control means responsive to the position of said film perforation sensing member and the movement of said slip clutch means for coupling the movement of said first gear means and slip clutch means through said additional gear means to said drive means only when said first gear means is moved in a direction resulting from the movement of said reciprocable section in one of said directions and said sensing finger has a position other than a given film wind terminating position within one of said film metering apertures.

18. In a retractable camera having a main section on which is mounted substantially all of the camera mechanism, including shutter operating mechanism which, when released from a cocked position when a picture is taken, operates the camera shutter, and which further includes cartridge-receiving means for receiving a film cartridge including film with film metering perforations therein spaced one frame distance apart and film moving means for engaging the film to impart movement thereto, said main section of the camera having drive means to be coupled to said film moving means in said cartridge, said main section of the camera further including a film perforation sensing member movably urged toward the path of movement of the film metering perforations of said film, said camera further having a reciprocable section mounted on the main camera section for movement between a retracted position and an extended position, the improvement comprising: film wind actuating means on said reciprocable section of the camera, and film advancing and slip clutch mechanism on said main section of the camera and coupled between said film wind actuating means on said reciprocable section and said drive means on said main section of the camera, said film advancing and slip clutch mechanism comprising first rotatable means rotated respectively in first and second directions when said reciprocable section is reciprocated in one direction and the other between said retracted and extended positions, slip clutch means normally rotatable with said first rotatable means and being slippable with respect thereto when an end of the film restraining force is applied thereto, planetary gear means rotatable in only a film winding direction and having internal teeth and a portion thereof constituting said drive means to be coupled to said film moving means on said cartridge, eccentrically mounted gear means pivoted upon and carried by said slip clutch means and engaging said internal teeth of said planetary gear means, centrally mounted gear means meshing with said eccentrically mounted gear means, said eccentrically mounted gear means when said slip clutch means is rotated rotating in non-driving relationship to the internal teeth of said planetary gear means when said centrally mounted gear means is free to rotate and engaging said internal teeth in driving relationship therewith to effect a film winding operation when said centrally mounted gear means is held against rotation, ratchet wheel means drivingly connected to said centrally mounted gear means, pawls means engagable with said ratched wheel so that the ratchet wheel can freely rotate in a first direction and is held against rotation in the other direction by the pawl means, said pawl means normally being in engagement with said ratchet wheel so the latter cannot rotate in said one direction when the reciprocable section is moved in a direction to effect a film winding operation, and means responsive to said film perforation sensing member entering and assuming a given position with a film perforation for removing said pawl means from engagement with said ratchet wheel means.

19. In a camera having a main housing enclosing most of the components of a cmaera and formed by top and bottom walls, vertical front and rear walls extending between the front and rear margins of said top and bottom walls, said vertical rear wall being movable between a housing closing position and a housing uncovering position when a film cartridge can be inserted into a cartridge-receiving compartment in the main housing, and an end wall extending between one side margin of the top, bottom, front and rear walls, said front wall having adjacent thereto an objective lens window therein for receiving picture-forming light rays and which has an exposed transparent surface on which dust can accumulate, the improvement wherein the side margin of said main housing opposite the one including said end wall having mounted thereat for horizontal sliding movement on said main housing a viewfinder assembly, said viewfinder assembly being mounted for movement between a retracted position where it is retracted to a point adjacent the end margin of said vertical rear wall of said main camera housing and provides an overall relatively compact assembly and an operative extended position where it extends horizontally substantially beyond said end margin of said vertical rear wall, and said viewfinder assembly having means supported at least one lens element located between said rear wall and said cartridge-receiving compartment so it is covered over by said rear wall of said main housing when the viewfinder assembly is in its retracted position and is exposed to be placed next to the viewer's eye when the viewfinder assembly is in its extended position.

20. The pocket sized still camera of claim 19 wherein said viewfinder assembly has a housing forming an apparent continuation of at least the top, bottom and front walls of said main housing.

21. The pocket sized still camera of claim 19 wherein said viewfinder assembly has dust cover-formed means for providing a dust cover for said light receiving surface of said objective lens window and for exposing the same when the viewfinder assembly is in said extended position.

22. The pocket sized still camera of claim 19 wherein said main housing has film winding mechansim which advances the film one frame distance, and said viewfinder assembly includes means which impart movement of said film winding mechanism when said viewfinder assembly is moved between said positions.

* * * * *